United States Patent
Vaitovirta et al.

(10) Patent No.: US 8,990,822 B2
(45) Date of Patent: Mar. 24, 2015

(54) DATA PROCESSING ARRANGEMENT

(75) Inventors: Hannu Vaitovirta, Espoo (FI); Henri Tervonen, Espoo (FI); Jarmo Hillo, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 1467 days.

(21) Appl. No.: 12/219,328

(22) Filed: Jul. 18, 2008

(65) Prior Publication Data
US 2009/0228890 A1  Sep. 10, 2009

(30) Foreign Application Priority Data
Mar. 7, 2008 (FI) .................................... 20085217

(51) Int. Cl.
  G06F 9/455 (2006.01)
  G06F 9/46 (2006.01)
  G06F 9/50 (2006.01)
(52) U.S. Cl.
  CPC ........ *G06F 9/5027* (2013.01); *G06F 2209/503* (2013.01); *G06F 2209/5022* (2013.01)
  USPC ...................................................... 718/104
(58) Field of Classification Search
  None
  See application file for complete search history.

(56) References Cited

U.S. PATENT DOCUMENTS

| 5,283,897 A * | 2/1994 | Georgiadis et al. ........... 718/105 |
| 2006/0095741 A1 | 5/2006 | Asher et al. |
| 2006/0133389 A1 | 6/2006 | Wybenga et al. |
| 2007/0061286 A1 * | 3/2007 | Liu et al. ........................... 707/2 |
| 2007/0169001 A1 * | 7/2007 | Raghunath et al. ........... 717/130 |
| 2007/0294689 A1 * | 12/2007 | Garney .............................. 718/1 |

OTHER PUBLICATIONS

Hanping, J., et al.; "Research and Design for IPSec Architecture on Kernel"; Worshop on Knowledge Discovery and Data Mining; Jan. 23, 2008; pp. 509-512.
International Search Report, PCT/FI2009/050112, dated Jun. 10, 2009.
Piya Bhaskar et al: "Design Considerations for Next Generation Satellite Terminal", Military Communications Conference, 2007. MILCOM 2007. IEEE, IEEE, Piscataway, NJ, USA, Oct. 29, 2007, pp. 1-5, XP031232601, ISBN: 978-1-4244-1512-0.
Dean Neumann: "Intel Virtualization Technology in Embedded and Communications Infrastructure Applications", Intel Technology Journal, vol. 10, No. 03, Aug. 10, 2006, XP55020417, ISSN: 1535-864X, DOI: 10.1535/itj.1003.05.
Extended European Search Report, Supplementary Search Report, dated Aug. 24, 2012; Issued on corresponding Application No. 09717327.2.
Chinese Office Action, dated Aug. 30, 2012; Issued on corresponding Application No. 200980116014.7.

* cited by examiner

Primary Examiner — Corey S Faherty
(74) Attorney, Agent, or Firm — Squire Patton Boggs (US) LLP

(57) ABSTRACT

A data processing method and apparatus, wherein control-plane data of a communication system is processed in a multicore processing element and user-plane data of the communication system is processed in the same multicore processing element.

18 Claims, 5 Drawing Sheets

DATA PROCESSING ARRANGEMENT

FIELD OF THE INVENTION

The present invention relates to a data processing method and apparatus in a communications network.

BACKGROUND OF THE INVENTION

The network controllers in present communications networks, such as RNCs (Radio Network Controllers) in 3G networks, have highly specialized data processing arrangements, dedicated for the processing of specific types of software processes. In RNC, such dedicated data processing arrangements have been designed for efficient processing of the user-plane and control-plane data. One key to the efficient processing of user and control-plane software processes in RNC is that they are processed in separate plug-in units within RNC, employing different processing technology and different operating systems. The different technologies also involve multiple programming, debugging and packaging environments.

One approach in further improving the processing capacity of the user-plane and control-plane processing in RNC is to increase the separation of user and control-plane processing into further dedicated plug-in units. However, improving the processing capacity by increasing the separation in the data processing arrangements increases the control traffic between the separate units. Due to the different technologies used in the plug-in units, the increased amount of control traffic introduces a need for fast connections between the plug-in units and conversions between the technologies of the plug-in units. Also, with the increased separation, it becomes increasingly difficult to achieve good utilization rates in all the different plug-in units designed for processing specific types of software processes.

Therefore, a new solution is needed to improve the processing efficiency and to increase the capacity of the data processing arrangement of a network controller of a communications network.

DISCLOSURE OF THE INVENTION

An object of the present invention is thus to provide a new technique for increasing the processing efficiency and the capacity of control-plane and user-plane processing in a communications system. The object of the invention is achieved by a method and an apparatus as set forth in the independent claims. The preferred embodiments of the invention are disclosed in the dependent claims.

According to an aspect of the invention, the control-plane processing and the user-plane processing are both performed in the same multicore processing element.

In an embodiment of the invention the processing resources of the multicore processing element are allocated to the control-plane processing and the user-plane processing on demand basis, and messages between the control-plane processing and the user-plane processing are transferred inside the multicore processing element. In other words, the control-plane processing and the user-plane processing are separated logically instead of by physical separation employed in the prior art approaches. The logical separation means that the user-plane and the control-plane are implemented using the same processing technology, i.e. the same multicore processing element. Thereby, the control-plane and the user-plane can use the same processing resources and easily take processing load from another by allocating processing resources on per need basis.

In an embodiment of the invention, the multicore processor element comprises a single integrated multicore processor circuit. An internal communication medium, such as an internal bus, offers almost unlimited bandwidth between the user-plane and the control-plane. In another embodiment of the invention, the multicore processor element comprises a plurality of integrated multicore processor chips interconnected with a high-speed data transfer medium, such as high-speed bus, a cache memory or network, to form a single logical multicore processing element. The performance is optimal as all the message transfers happen inside a single processing element. Multiple operating systems can be utilized inside a single processing element, or across the whole logical processing element, each with maximum efficiency. Scalability between the user-plane, the control-plane and optionally also the network management layer can be achieved by allocating a different number of processor cores for different purposes. Thus, the performance can be optimally fine-tuned.

The invention offers significant advantages over the prior art approaches, wherein, due to the plug-in units employing different technologies, available resources on some of the plug-in units cannot be used for processing the software processes of another technology. The invention also avoids the control traffic between the control and user-plane plug-in units and possible conversions between the different technologies used in the plug-in units needed in the prior art approaches for the interaction between software processes.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following the invention is described employing the context and terminology used in UMTS (Universal Mobile Telecommunications System) as defined in 3GPP (3rd Generation Partnership Project), although the invention can be applied to other networks and technologies, such as GSM (Global System for Mobile Communications), WiMAX (Worldwide Interoperability for Microwave Access), WLAN (Wireless Local Area Network), LTE (Long Term Evolution), HSPA (High Speed Packet Access) or Bluetooth® standard, or any other suitable standard/non-standard wireless communication means.

Figure 2A:
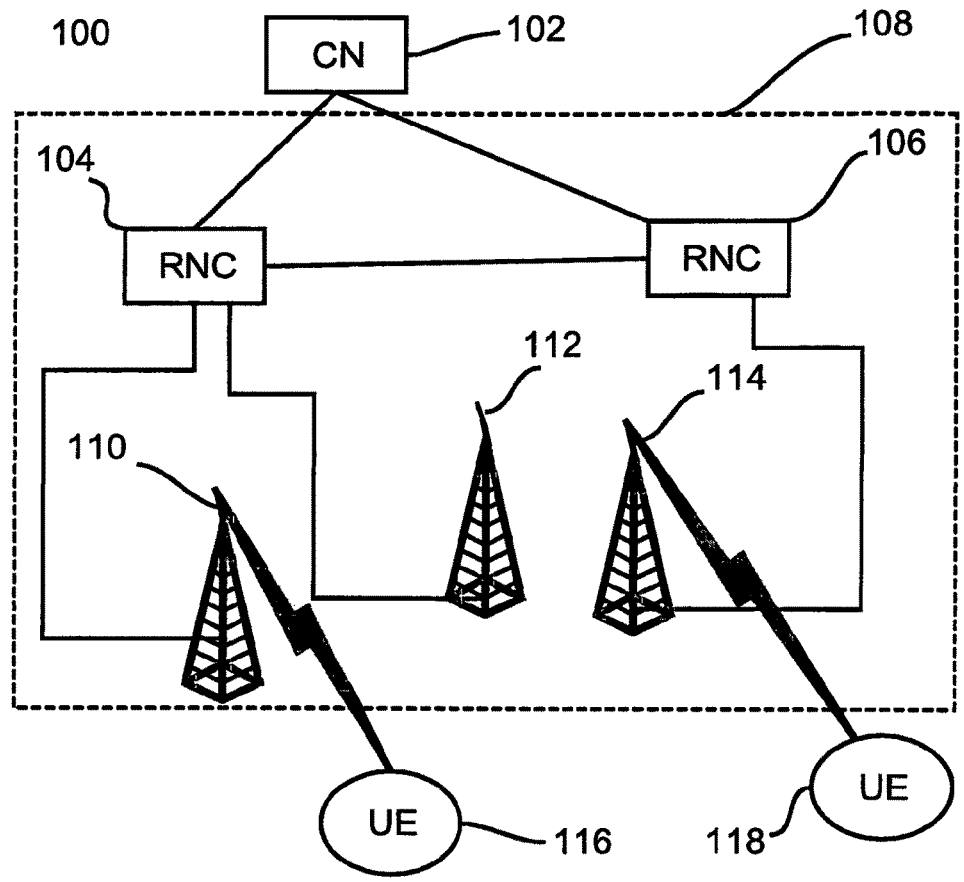
FIG. 2A illustrates a typical operating environment of an apparatus according to an embodiment of the invention.

FIG. 2A illustrates an exemplary operating environment of an apparatus according to an embodiment of the invention. In an embodiment of the invention the operating environment is a communications network 100, such as the UMTS (Universal Mobile Telecommunications System) network. The UMTS network 100 comprises a CN (Core Network) part 102, UTRAN (UMTS Terrestrial Radio Access Network) part 108 and UEs (User Equipment) 116, 118. UEs access the network via radio connection to UTRAN to make calls or to access the Internet, for example. The access method in UTRAN is a Wideband Code Division Multiple Access (WCDMA). The CN part of the network is responsible for switching and routing calls and data connections to external networks. The UTRAN part of the network handles all radio-related functionality in UMTS. UE may access the network via network access nodes 110, 112 and 114. In UMTS, the access nodes are called NodeBs and they provide the radio connection between UE and UTRAN. The UMTS network controller, RNC (Radio Network Controller), 104 and 106 manages the radio resources and is the service access point for the services that UTRAN provides to CN and UEs. It should be noted that UTRAN is only one example of a suitable radio access network. The principles of the invention can be applied to any other WCDMA network, wireless access network, or more generally, any communication network having user-plane and control-plane processing.

User plane processing may be any processing performed by a node in a communications network that is needed to process user payload in order to forward it through the network node. Control plane processing is any processing performed by the network node, required to control the user-plane packet or data flow, including the management of the network node.

The processors utilized in a network controller, such as an RNC, may be any kind of processors capable of executing software processes. However, as many software processes need to be run concurrently in RNC, the processors must support the concurrent execution of the software processes. Efficient concurrent execution in the processing unit requires that the connections used in the interaction be fast.

According to an aspect of the invention, the control-plane processing and the user-plane processing are both performed in the same multicore processing element such that the processing resources of the multicore processing element are allocated to the control-plane processing and the user-plane processing on demand basis, and messages between the control-plane processing and the user-plane processing are transferred inside the multicore processing element.

Figure 1A:
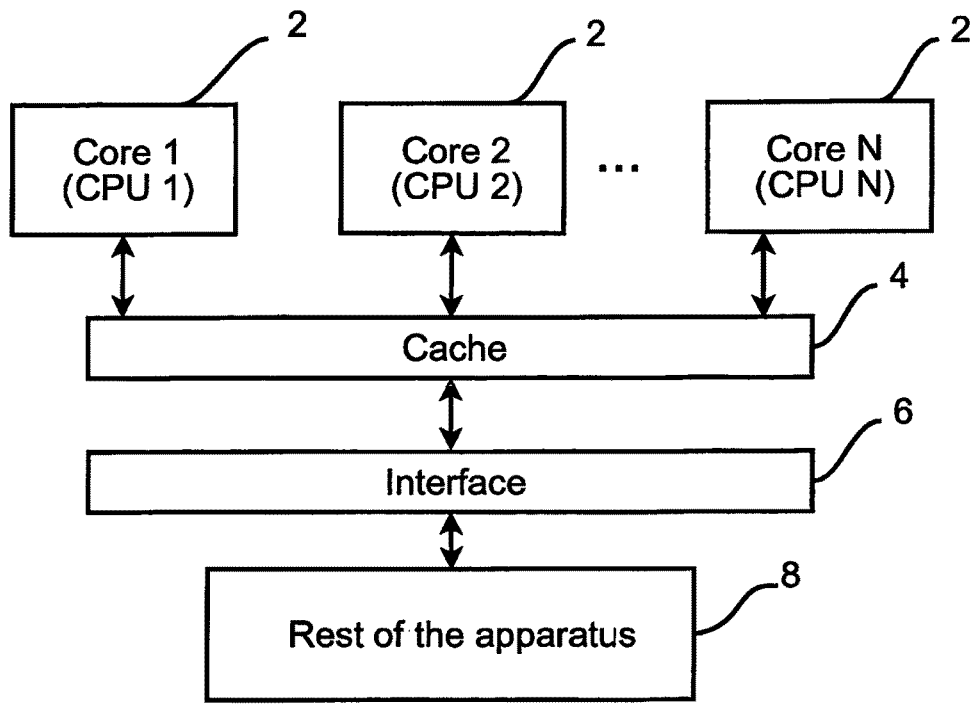
FIG. 1A illustrates an example of a multicore processing element implemented by a single integrated multicore processor chip.

In an embodiment of the invention, the multicore processor element comprises a single integrated multicore processor circuit. Referring to FIG. 1A, a multi-core processor (or a chip-level multiprocessor) combines any number N of independent cores (CPUs) 2 into a single package composed of a single integrated circuit (IC) chip or more chips packaged together. A dual-core processor contains two cores, and a quad-core processor contains four cores. A multicore microprocessor is able to implement multiprocessing in a single physical package. The cores 2 in a multicore device may share a single coherent cache memory 4 at the highest on-device cache level or may have separate caches. The cores within a multicore processor integrated circuit package may also be connected with each other via internal buses providing therefore high bandwidth connections between the cores, and thus between the interacting software processes executed in the cores. The cores may also share the same interface 6 to the rest of the apparatus 8. The interface 6 may be for example a high speed bus or a network. The network technology may be Ethernet or IP (Internet Protocol) based or any other suitable technology. Examples of multicore processors include OCTEON CN58XX, CN57XX, CN56XX, CN55XX, CN54XX, CN38XX, CN31XX and CN30XX SoC processors with 1 to 16 cores on a chip, available from Cavium Networks.

Figure 1B:
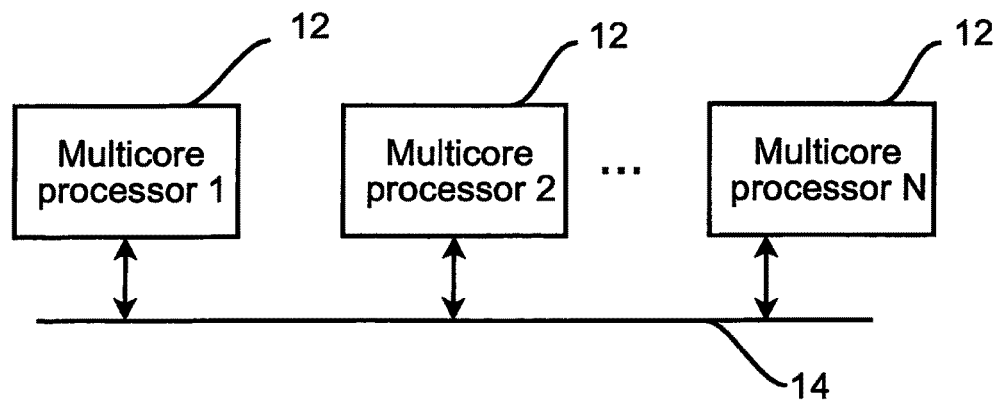
FIG. 1B illustrates an example of a multicore processing element implemented by multiple integrated multicore processor chips interconnected by a high-speed communication medium.

In another embodiment of the invention, the multicore processor element comprises a plurality of integrated multicore processor chips 12 interconnected with a high-speed data transfer medium 14, such as high-speed bus, a cache memory or a network, to form a single logical multicore processing element, as illustrated in FIG. 1B. The network technology may be Ethernet or IP (Internet Protocol) based or any other suitable technology.

Figure 2B:
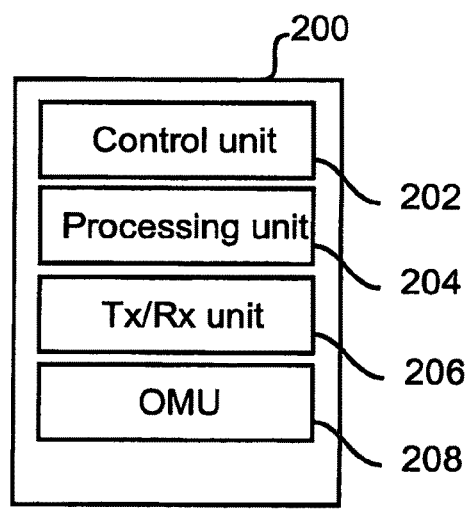
FIG. 2B illustrates an apparatus according to an embodiment of the present invention.

FIG. 2B illustrates an apparatus 200 according to an exemplary embodiment of the invention. Although the apparatus has been depicted as one entity, different modules and memory may be implemented in one or more physical or logical entities. According to the embodiment of the invention, the apparatus is a network controller controlling communications in a communications network. Specifically, the apparatus may be a radio network controller RNC operable in a radio access network, such as RNC 104 or 106 in FIG. 1. The apparatus 200 may comprise a Tx/Rx (transceiver) unit 206 for communicating with other devices and systems, such as CN 102, other RNC, or NodeBs 110, 112, or 114, as in FIG. 1. The Tx/Rx unit may receive and transmit messages or any other communications. The messages or other communications may be associated with services offered by an RNC to the connecting NodeBs and CN. The services may be for example, setting up, modifying and releasing bearers, paging, etc. A typical example of a service offered by RNC is the service of originating or terminating calls to UEs connecting to RNC via NodeBs.

The apparatus 200, such as an RNC, may also comprise a processing unit 204 that provides the apparatus with the data processing resources needed for its operations. The data processing resources in the processing unit may be allocated to execute program code stored in the apparatus. The program code may be executed as software processes in the processors of the processing unit. In exemplary embodiments of the invention, the processing unit may be implemented by the multicore processor element described above with reference to FIGS. 1A and 1B.

The operation mode of each core of a multicore processor may be defined in the memory of the multicore processor. Therefore, the cores may be set to be dedicated for processing certain types of software processes. In an embodiment of the invention, the multicore processor cores may be in an operation mode for processing software processes needing real-time processing or in an operation mode for processing software processes with less strict delay requirements. A user-plane data needs real-time processing, whereas the timing requirement of a control-plane data is less strict. Accordingly, in exemplary embodiments of the invention the operation modes of the multicore processor cores for processing user-plane data and control-plane data may be called the network processor and server mode respectively. To meet the delay requirements, RTOS (Real-Time Operating System) may be used as an operating system in the network processor mode, or an operating system may not be used at all. Linux is an example of an operating system suitable to be used in the server mode.

In RNC the operation modes may be control-plane and user plane processing, for example. Thus, the operation modes of cores of a multicore processor may be set for processing either user-plane or control-plane software processes.

A control unit 202 may be provided to control the operation of the apparatus 200 and the units therein. In an embodiment of the invention the control unit 202 controls the operation of the processing unit 204 of the apparatus. The control unit 202 may perform resource management of the processing unit 204. Thus, the control unit 202 may be capable of allocating the data processing resources from the processing unit 204 for the execution of software processes. The control unit 202 may also comprise or be connected to a memory storing information needed in the resource management of the data processing unit resources. The information may be operational parameters of the processing unit 204, information about allocated and unallocated resources in the processing unit 204, and information about execution of software processes in the processing unit 204. The operational parameters may comprise resource allocation rules to be applied to the data processing resources of the processing unit and processing unit configuration information. The processing unit configuration information comprises the information defining the operation modes of the multicore processor cores in the processing unit 204.

The apparatus 200 may further include an OMU (Operations and Maintenance Unit) 208 that provides a management interface to the operational parameters of the apparatus 200. In an embodiment of the invention, OMU 208 may be used for managing the operational parameters of the processing unit 202. The OMU 208 may be connected by, for example, a support engineer using an IP (Internet Protocol) connection, and the support engineer may manage the operational parameters via a management interface, such as a web-based interface. Through the management interface, the engineer may define the operational parameters of the processing unit 204. The management interface may be used for uploading operational parameter files or making selections for the operational parameters of the processing unit 204. From OMU 208, the operational parameters may be transmitted to the control unit 202 controlling the processing unit. The control unit 202 may then apply the received operational parameters in controlling the processing unit 204. In addition to the above, OMU 208 may collect and store operations and management information, such as event log information of the various units 202-208 of the apparatus 200.

In embodiments of the invention, in addition to the processing unit 204, also one or more of the other functional units 202, 206 and 208 may be implemented in the multicore processor element described above with reference to FIGS. 1A and 1B.

Figure 3:
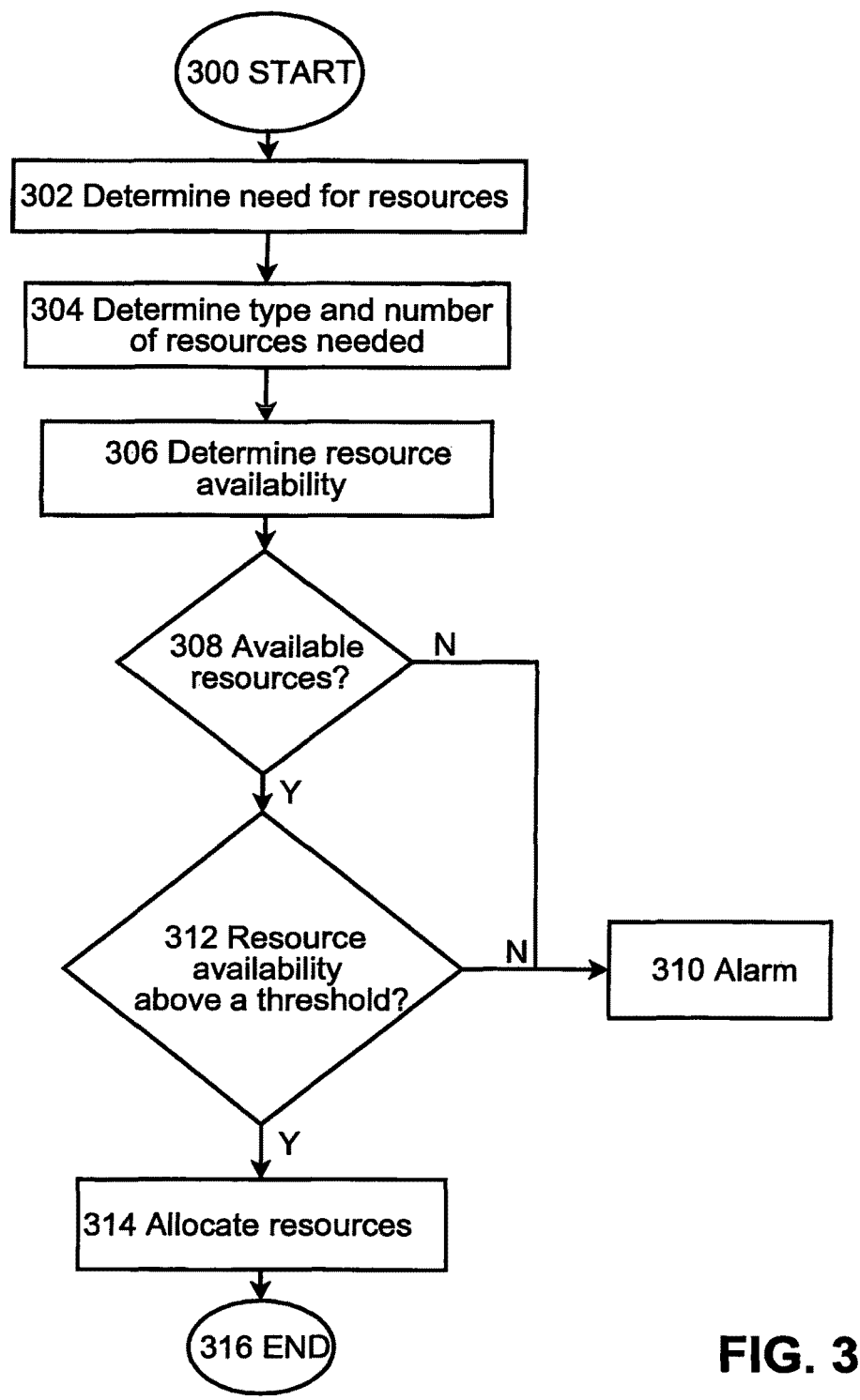
FIG. 3 illustrates a flow chart according to an embodiment of the invention.

In FIG. 3, processing steps are illustrated for a control unit according to an embodiment of the invention. In the present embodiment of the invention the control is the control unit 202 of the apparatus 200 of FIG. 2B. FIG. 2A illustrates the exemplary operating environment when the apparatus 200 is an RNC.

The process in FIG. 3 starts at 300. In 302, the control unit 202 determines that data processing resources are needed in the apparatus (e.g. RNC) for executing one or more software processes. In an embodiment of the invention, the data processing resources are allocated from a processing unit comprising one or more multicore processors, as illustrated in FIGS. 1A and 1B.

In an embodiment of the invention, the control unit 202 determines that data processing resources are to be allocated, on the basis of the message received in the Tx/Rx unit of the apparatus 200. The message may be for example a RACH (Random Access Channel) message received from UE accessing the network. Accordingly, the RACH message identifies a need for data processing resources within the apparatus 200 (e.g. RNC) for the execution of one or more software processes associated with the RACH procedure of UE. The resource need may be identified as a number of multicore processor cores in a certain operation mode that is needed for executing the software processes.

In 304, the required type and number of resources are determined in the control unit 202. In an embodiment of the invention the control unit 202 determines the number and operation modes of multicore processor cores to be allocated to the one or more software processes.

In 306, the control unit 202 determines the resource availability in the processing unit 204. The resource availability indicates the number of available resource units in the processing unit 204. A high availability means that the processing unit has unused capacity to be allocated. A low availability means that the processing unit 204 has little unused capacity to be allocated. When the processing unit 204 comprises resource units in different operation modes, the resource availability indicates the number of available resource units per each operation mode. The Initial operation modes of the resource units may be determined in the system start-up phase by configuration or other operational parameters. In an embodiment of the invention, where the control unit 202 controls the operation of multicore processors in the apparatus 200, the control unit 202 determines the resource availability of each multicore processor. Accordingly, the resource availability indicates the number of available cores in each multicore processor. When the multicore processor cores have different operation modes, such as operation modes for processing control-plane or user-plane data, the resource availability indicates the number of available cores in each operation mode.

In 308 it is determined, on the basis of the required resources determined in 304 and available resources determined in 306, whether there are enough resources to be allocated. Therefore, in 308 the resource availability of multicore processor is compared with the required resources. In an embodiment of the invention, in 308 the resources required by one or more software processes are compared with the resource availability of each multicore processor. If the resource availabilities of each of the multicore processors indicate that the requested number of resources is not available, it is determined that there are no available resources in the multicore processors for processing the software processes and the processing continues to 310.

When the resources are requested for software processes that need to interact, it is preferable that such processes are executed so that efficient communication between the processes is enabled. According to an embodiment of the invention employing multicore processors, the cores for executing the software processes should be allocated from the same multicore processor for efficient communications between the processes. Therefore, in 308 the requested resources in each operation mode for the software processes are compared with the numbers and modes of cores available in each multicore processor. If none of the multicore processors has the requested number of cores in the requested modes, it is determined that there are no available resources and the processing continues to 310.

In 312 it is determined whether the resource availability value determined in 306 is above or at a threshold value. The comparison between the resource availability and the threshold may be made to all multicore processors and the respective resource availabilities. The threshold value may be one of the operational parameters that may be defined via OMU. For example, the threshold may be set to correspond to 70% of the resources. If the resource availability status of the required resource type is above a threshold value requested resource is available and the processing continues to 314.

In 310, the control unit generates an ALARM message alarming of possible overload in the processing unit due to lack of resources. The message may be transmitted for example to OMU to be stored in a system alarms log. The ALARM message may identify that the software processes were not executed due to not having processing resources or that a threshold for resource availability has been reached. Accordingly, the ALARM message may identify the software processes that were not executed due to lack of resources and the resources, such as multicore processors, that do not have available cores or have reached the threshold value in the resource availability. Additionally, also the lack of cores in certain operation mode may be identified.

In 314, the control unit determines the resource units to be allocated to the one or more software processes. The resource unit allocation is performed on the basis of resource availability and the required resources are determined respectively in 306 and 304. In the allocation of the resource units statistical multiplexing may be used to share the load between resource units within the processing unit.

In an embodiment of the invention the operation modes of the multicore processor cores in one or more multicore processors have been configured, for example in the system start-up phase. In such a case, in 314 the control unit allocates cores from the processing element according to the configured operation modes.

In an embodiment of the invention the control unit allocates resources for two or more interacting software processes. The cores for executing the software processes are selected from the multicore processors so that the cores reside within the same multicore processor so as to enable efficient messaging during the execution of the interacting software processes.

When the interacting software processes are executed in the same multicore processor, the interaction of the software processes is efficient due to high bandwidth connections between cores within the same processor package. Additional benefits may be achieved with the resource allocation as above, when the cores of the multicore processor use the same memory, such as a common cache within the multicore processor. In such a case, the information may be stored and read from the common memory, and the interaction between the software processes is efficient.

In an embodiment of the invention, in 314 the control unit may allocate resources from the processing unit on the basis of the operational parameters. The operational parameters may cause the control unit to allocate resources according to different situations for example by using statistics of multicore processor core load, measured or estimated traffic mix, time of the day, the week, the month, or the year or any other method that monitors or predicts future behaviour of the system. The operational parameters that define the resource allocation in different situations as above may be configured through OMU as will be described below.

In an embodiment, the initial operation modes of the multicore processor cores may be changed according to the operational parameters so as to enable optimal allocation of processing resources in 314. The operational parameters may define the configuration of the processing element in the numbers of cores of different operation modes in different situations as above. The possibility to change the operation modes enables scalability in the numbers of cores allocated for different operation modes, such as user-plane and control-plane processing modes. In small processing elements it may be preferable that the numbers of cores in each operation mode be fixed to ensure enough resources in each mode. Therefore, to allow statistical multiplexing in load sharing the number of cores in the processing element should be large, for example higher than 20, preferably higher than 50, and more preferably higher than 100.

In an embodiment of the invention, the process illustrated in FIG. 3 may form a loop, where, after the resources are allocated for software processes in 314, the execution of the process returns to 302 to allocate processing resources according to a new need for processing resources determined in 302.

In an embodiment of the invention, when the utilization rate of the processing unit is at a high level, the resource availability in 308 in the process of FIG. 3 may indicate that there are no resources available to be executed to new software processes. In such a case, the control unit may determine that the configuration of the processing unit needs to be changed to allocate resources to both the processes already being executed in the processing unit and the new software processes. Accordingly, when the processing unit comprises one or more multicore processors, the control unit changes the operation modes of the cores in order to allocate the required number of cores to the new software processes. In an exemplary embodiment, the operation modes of the cores of the multicore processors in the processing unit are changed so that the required number of cores in each operation mode may be allocated within a single multicore processor to enable fast interaction between interacting software processes. As an advantage, the utilization rate of the cores and multicore processors is improved and the new software processes may be executed.

The process ends in 316.

Figure 4:
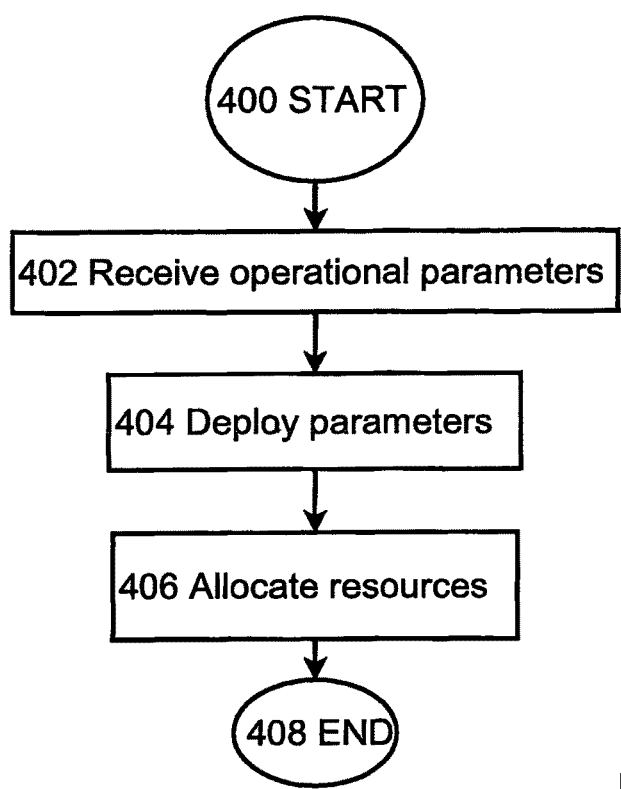
FIG. 4 illustrates a flow chart according to an embodiment of the invention.

In FIG. 4 processing steps are illustrated for a control unit according to an embodiment of the invention, where the operational parameters of the control unit are set by OMU. In the embodiment of the invention the control unit and OMU may be, for example, the control unit 202 and OMU 208 in RNC 200 of FIG. 2B. FIG. 2A illustrates an exemplary operating environment of RNC, where the control unit may be implemented. The process starts at 400. In 402 the operational parameters are received in the control unit in a message from OMU. On the basis of the received operational parameters, the control unit controls the operation of the processing unit. The operational parameters may be received for example as files that are then stored in the control unit.

In an embodiment of the invention, in 402 the control unit receives operational parameters in a message from OMU defining the operation modes of the multicore processors in the processing unit. In such a case, the operational parameters define the number of cores in the processing unit in each operation mode.

In an embodiment, the control unit receives in 402 from OMU a message indicating that the core distribution in each multicore processor should be set to the control and user-plane operation modes, for example 20% of the cores dedicated for the control-plane and 80% of cores dedicated for the user-plane processing.

In an embodiment of the invention, the operational parameters received from OMU in 402 may only be applicable at a certain time of the day, such as in day time, night time, or a certain week, month or year, or the operational parameters may be applied depending on the amount of traffic, such as according to traffic load, for example according to high-traffic and low-traffic situations. The operational parameters may also be set to correspond to a traffic mix that may be measured or estimated. Accordingly, different operational parameters may be received from OMU with accompanying information that identifies when they should be deployed.

In an embodiment of the invention, the message received from OMU in 402 comprises a resource availability threshold to be used in allocation of core resources to software processes. The control unit stores the new threshold in 404. Then in the process of FIG. 3, the new threshold parameter is used in step 312. Accordingly, the resource availability threshold received from OMU affect the sensitivity to trigger alarm in the process of FIG. 3.

In an embodiment of the invention the operational parameters received from OMU in 402 indicate to the control unit that the number of resources in the processing unit has increased or decreased. This may be the case when the number of multicore processors and thereby the number of cores has changed in the processing unit of RNC. When such a message is received from OMU, the control unit may need to re-deploy the operational parameters to the processing unit. The indication that the number of resources in the processing unit has changed may also be received in the control unit with the other information received from OMU, as explained above.

In 404, the received operational parameters are deployed. In the embodiment of the invention, the operation modes of the multicore processors are deployed. When the operational parameters define the number of cores or the distribution of cores in each operation mode, the control unit sets the operations modes of the cores in the multicore processors accordingly.

In the embodiment of the invention, where the operational parameters received from OMU in 402 are accompanied by information identifying when they should be deployed, in 404 the operational parameters are deployed in accordance with the accompanying information.

In 406 the resources may be allocated to one or more software processes according to the new operational parameters, as illustrated in the process of FIG. 3. The received indication in 402 that resources have been increased or decreased is taken into account in the control unit in the resource allocation.

The process ends in 408.

Figure 5:
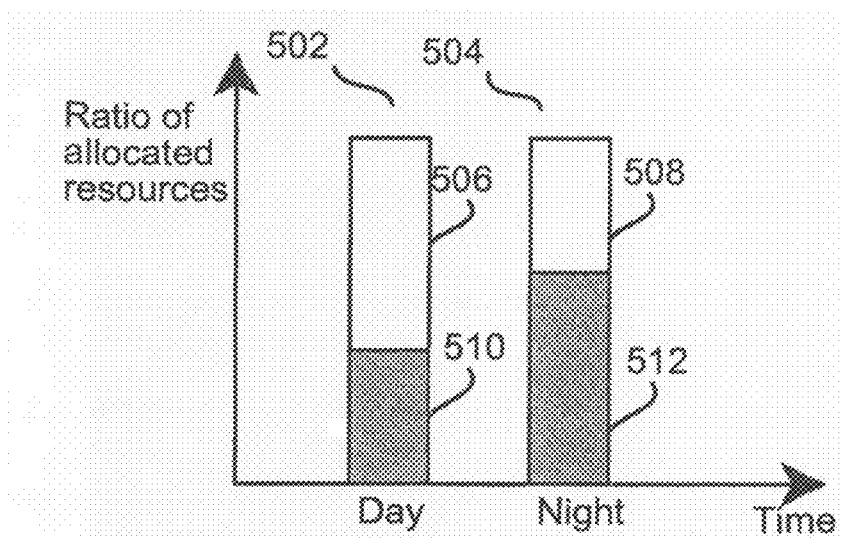
FIG. 5 is a diagram illustrating resource allocation according to an embodiment of the invention.

In FIG. 5, the resource allocation according to the above embodiments of the invention is illustrated. Columns 502 and 504 represent different core distributions in the processing of the RNC, such as RNC 200 in FIG. 2A. Column 502 represents the core distribution between two operation modes of cores. The operation modes of the cores may be set as in the process described in FIG. 4. Accordingly, column 502 represents the day-time configuration of the cores between two operation modes. There, the majority 506 of the multicore processor cores in the processing unit is allocated to process control-plane software processes, and the minority 510 is allocated to process user-plane software processes. The column 504, on the other hand, describes the core configuration during night-time. Then the majority 512 of the multicore processor cores in the processing unit is allocated to process user-plane software processes, and the minority is allocated to process control-plane software processes 508. The above examples of processor core configurations within RNC are exemplary and are in practise determined by traffic patterns of the network the RNC is operating in. Therefore, for the optimum efficiency in the use of the resources of the processing unit, the core configurations should be determined for each RNC separately.

Figure 6:
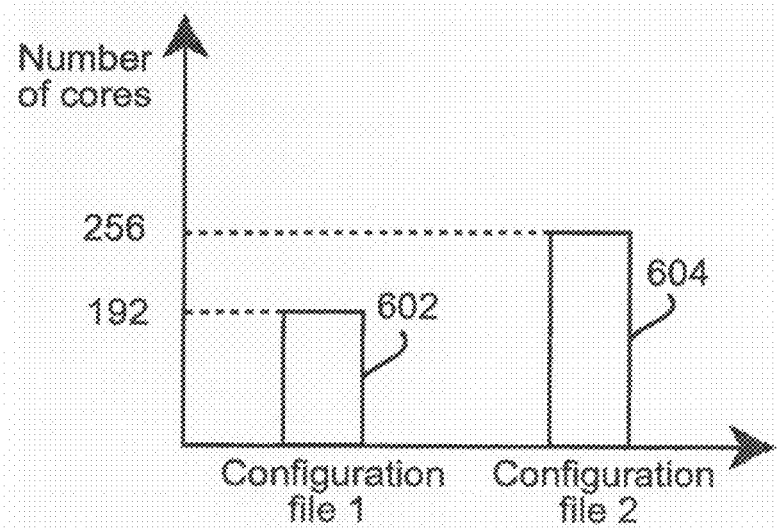
FIG. 6 is a diagram illustrating a multicore processor core configuration according to an embodiment of the invention.

FIG. 6 illustrates a multicore processor core configuration according to an embodiment of the invention, where the resource configuration of the processing unit has been changed due to an increase in processing resources, such as a plug-in unit comprising multicore processors. The columns 602 and 604 illustrate the total number of cores in a processing unit, such as a processing unit 204 in FIG. 2A. In column 602, the control unit is configured to allocate resources from 192 multicore processor cores in the processing unit as authorized by configuration file 1. In column 604, configuration file 2 allows the resource allocation of 256 multicore processor cores. Accordingly, the control unit may be configured via OMU according to the process presented in FIG. 4 to control also an increased number of multicore processor cores.

The steps/points, signaling messages and related functions described above in FIGS. 3 and 4 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The control unit and processing unit operations illustrate a procedure that may be implemented in one or more physical or logical entities.

The present invention is applicable to any apparatus, such as user terminal, server, base station, access point, gateway, network controller or corresponding component, and/or to any communication system or any combination of different communication systems that process user-plane and control-plane data. The communication system may be a fixed communication system or a wireless communication system or a communication system utilizing both fixed networks and wireless networks. The protocols used, the specifications of communication systems, servers, base stations, access points, network controllers, gateways and user terminals or other apparatuses, especially in wireless communication, develop rapidly. Such development may require extra changes to an embodiment. Therefore, all words and expressions should be interpreted broadly and they are intended to illustrate, not to restrict, the embodiment.

Apparatuses, such as user terminals, servers, base stations, access points, gateways, network controllers or corresponding components, and/or other corresponding devices or apparatuses implementing the functionality of a corresponding apparatus described with an embodiment comprise not only prior art means, but also means for processing control-plane data of a communication system in a multicore processing element and means for processing user-plane data of the communication system in the same multicore processing element. In addition, they may comprise means for allocating the processing resources of the multicore processing element to the control-plane processing and the user-plane processing on demand basis and means for performing message transfers between the control-plane processing and the user-plane processing inside the multicore processing element. More precisely, they comprise means for implementing functionality of a corresponding apparatus described with an embodiment and they may comprise separate means for each separate function, or means may be configured to perform two or more functions. Present apparatuses comprise processors and memory that can be utilized in an embodiment. For example, the control unit 202 may be a controller, a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a user terminal, a server, base station, access point, gateway, network controllers or a corresponding component, may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
    processing control-plane data and user-plane data of a communication system in a multicore processor;
    determining a need for data processing resources in the multicore processor;
    determining a number of resource units of first and second types to be allocated in the multicore processor;
    determining whether the multicore processor has the determined number of resource units of the first and the second types available; and
    if the number of resources of the first and the second types are available, allocating the number of resource units of the first and second types from the multicore processor.

2. A method according to claim 1, further comprising:
    allocating processing resources of the multicore processor to the control-plane processing and the user-plane processing on a demand basis; and
    performing message transfers between the control-plane processing and the user-plane processing inside the multicore processor.

3. A method according to claim 1, wherein the multicore processor comprises a single integrated multicore processor circuit.

4. A method according to claim 1, wherein the multicore processor comprises a plurality of integrated multicore processor chips interconnected with a high-speed data transfer medium to form a single logical multicore processor.

5. A method according to claim 1, further comprising:
    allocating the processing resources of the multicore processor to the control-plane processing and the user-plane processing on the basis of a traffic mix or a time of day, week, month or year.

6. A method according to claim 1, further comprising:
    allocating a different number of cores of the multicore processor to the control-plane processing and the user-plane processing on a configuration basis or a demand basis.

7. A method according to claim 1, further comprising:
    running a plurality of the cores of the multicore processor in a network processor mode for the user-plane processing, and running a plurality of different cores of the multicore processor in a server mode for the control-plane processing.

8. A method according to claim 1, wherein a number of cores in the multicore processor is higher than 20.

9. An apparatus, comprising:
    a multicore processor configured to process control-plane data and user-plane data of a communication system; and
    a controller comprising
        a determiner configured to determine a need for data processing resources in the multicore processor, to determine a number of resource units of first and second types to be allocated in the multicore processor and to determine whether the multicore processor has the determined number of resource units of the first and the second types available, and
        an allocator configured to allocate the number of resource units of the first and the second types from the multicore processor if the number of resources of the first and the second types are available.

10. An apparatus according to claim 9, further comprising:
    the controller configured to allocate processing resources of the multicore processor to the control-plane processing and the user-plane processing on a demand basis; and
    an internal communication medium configured to transfer messages between the control-plane processing and the user-plane processing inside the multicore processor.

11. An apparatus according to claim 9, wherein the multicore processor comprises a single integrated multicore processor circuit.

12. An apparatus according to claim 9, wherein the multicore processor comprises a plurality of integrated multicore processor chips interconnected with a high-speed data transfer medium to form a single logical multicore processor.

13. An apparatus according to claim 9, wherein the controller is configured to allocate processing resources of the multicore processor to the control-plane processing and the user-plane processing on the basis of a traffic mix, or a time of the day, the week, the month or the year.

14. An apparatus according to claim 9, wherein the controller is configured to allocate a different number of cores of the multicore processor to the control-plane processing and the user-plane processing on a configuration basis or a demand basis.

15. An apparatus according to claim 9, wherein the controller is configured to run a plurality of the cores of the multicore processor in a network processor mode for the user-plane processing, and to run a plurality of different cores of the multicore processor in a server mode for the control-plane processing.

16. An apparatus according to claim 9, wherein the number of cores in the multicore processing element is higher than 20.

17. An apparatus according to claim 9, wherein the control-plane and the user-plane are the control-plane and the user-plane of a wideband code division multiple access network.

18. An apparatus according to claim 9, wherein the control-plane and the user-plane are the control-plane and the user-plane of a worldwide interoperability for microwave access network.

* * * * *